US012645031B2

(12) United States Patent
Morishima

(10) Patent No.: US 12,645,031 B2
(45) Date of Patent: Jun. 2, 2026

(54) METHOD FOR MANUFACTURING OPTICAL FIBER CONNECTING COMPONENT

(71) Applicant: SUMITOMO ELECTRIC INDUSTRIES, LTD., Osaka (JP)

(72) Inventor: Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 305 days.

(21) Appl. No.: 18/268,062

(22) PCT Filed: Dec. 22, 2021

(86) PCT No.: PCT/JP2021/047694
§ 371 (c)(1),
(2) Date: Jun. 16, 2023

(87) PCT Pub. No.: WO2022/138763
PCT Pub. Date: Jun. 30, 2022

(65) Prior Publication Data
US 2024/0036256 A1 Feb. 1, 2024

(30) Foreign Application Priority Data
Dec. 25, 2020 (JP) ................................. 2020-217225

(51) Int. Cl.
*G02B 6/255* (2006.01)
*G02B 6/25* (2006.01)
(52) U.S. Cl.
CPC ............. *G02B 6/2555* (2013.01); *G02B 6/25* (2013.01)

(58) Field of Classification Search
CPC ...... G02B 6/2555; G02B 6/25; G02B 6/3861; G02B 6/3885; G02B 6/3652
See application file for complete search history.

(56) References Cited

U.S. PATENT DOCUMENTS

2014/0191427 A1* 7/2014 Anderson ............ G02B 6/3843
264/1.25
2016/0223761 A1* 8/2016 Nakanishi .......... G02B 6/02042
(Continued)

FOREIGN PATENT DOCUMENTS

JP 11-142688 * 5/1999
JP H11-142688 A 5/1999
JP 2005-284223 A 10/2005
(Continued)

*Primary Examiner* — Alex B Efta
*Assistant Examiner* — Alexander S Wright
(74) *Attorney, Agent, or Firm* — Oliff PLC

(57) ABSTRACT

A method for manufacturing an optical fiber splicing component includes preparing a plurality of optical fibers each including a glass fiber including a core and a cladding covering the core, and a resin coating covering the glass fiber, an end portion of the glass fiber being exposed from the resin coating, mounting the plurality of glass fibers on an optical fiber holding member so that the plurality of glass fibers exposed from the resin coating are arranged in a first direction and protrude outward from the optical fiber holding member, adjusting and fixing postures of the plurality of glass fibers around respective central axes, and collectively bonding two or more glass fibers among the plurality of glass fibers and the optical fiber holding member with an adhesive.

15 Claims, 12 Drawing Sheets

(56) References Cited

U.S. PATENT DOCUMENTS

| 2016/0252683 | A1 | 9/2016 | Sasaki et al. |
| 2020/0192040 | A1 | 6/2020 | Li et al. |

FOREIGN PATENT DOCUMENTS

| JP | 2015-125172 | A | 7/2015 |
| JP | 2015-145989 | A | 8/2015 |
| JP | 2015-169873 | A | 9/2015 |
| WO | 2020/179513 | A1 | 9/2020 |

* cited by examiner

METHOD FOR MANUFACTURING OPTICAL FIBER CONNECTING COMPONENT

TECHNICAL FIELD

The present disclosure relates to a method for manufacturing an optical fiber splicing component.

The present application claims priority from Japanese Patent Application No. 2020-217225 filed on Dec. 25, 2020, contents of which are incorporated by reference in its entirety.

BACKGROUND ART

Patent Literature 1 discloses a method for manufacturing an optical connector including multi-core fibers. According to the manufacturing method disclosed in Patent Literature 1, after the multi-core fiber is disposed in a V groove provided in a connector, a posture of the multi-core fiber around a central axis is adjusted (that is, the multi-core fiber is rotationally aligned).

CITATION LIST

Patent Literature

Patent Literature 1: JP2015-125172A

SUMMARY OF INVENTION

A method for manufacturing an optical fiber splicing component according to an aspect of the present disclosure includes: preparing a plurality of optical fibers each including a glass fiber including a core and a cladding covering the core, and a resin coating covering the glass fiber, an end portion of the glass fiber being exposed from the resin coating; mounting the plurality of glass fibers on an optical fiber holding member so that the plurality of glass fibers exposed from the resin coating are arranged in a first direction and protrude outward from the optical fiber holding member; adjusting and fixing postures of the plurality of glass fibers around respective central axes; and collectively bonding two or more glass fibers among the plurality of glass fibers and the optical fiber holding member with an adhesive.

DESCRIPTION OF EMBODIMENTS

Figure 1:
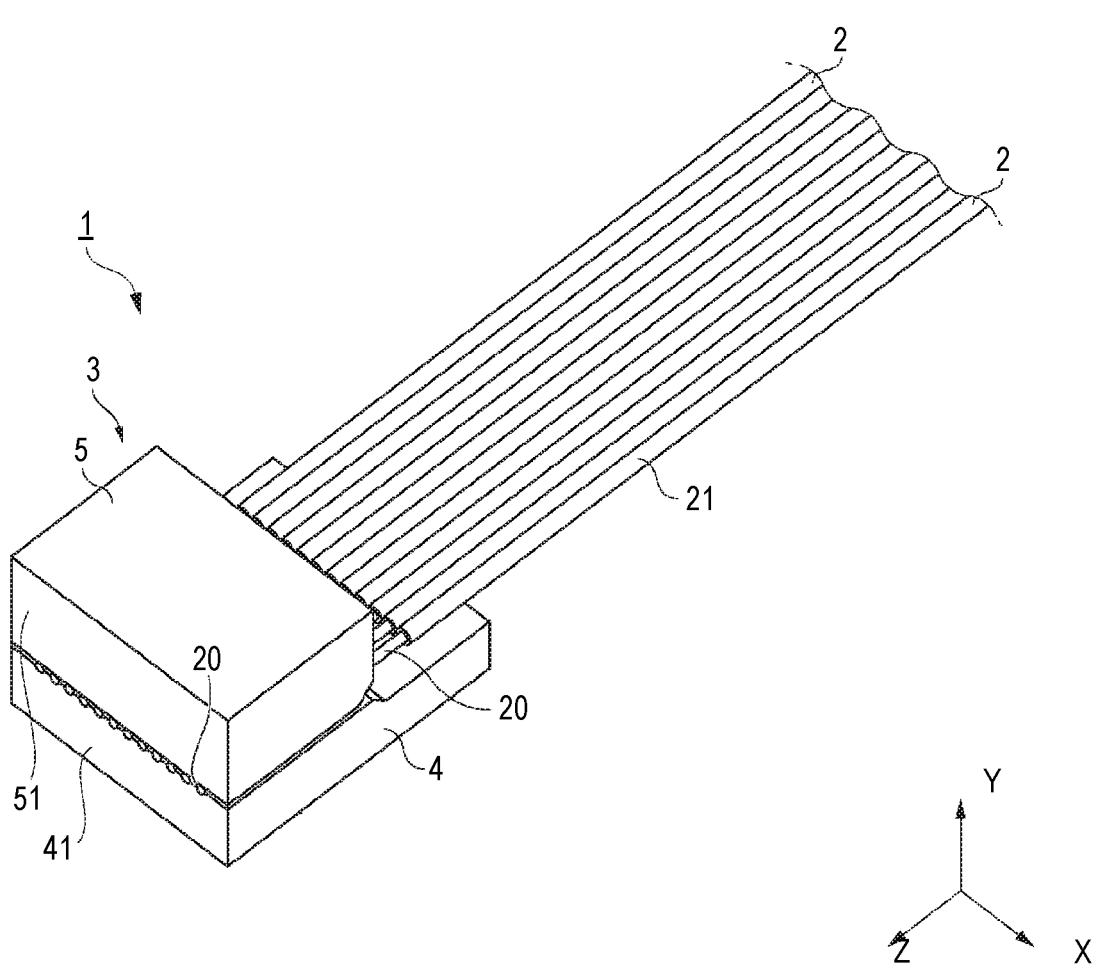
FIG. 1 is a perspective view showing an example of an optical fiber splicing component manufactured 1$w$ a method for manufacturing the optical fiber splicing component according to the present disclosure.

Problems to be Solved by Present Disclosure

In the method for manufacturing an optical connector including the multi-core fibers, after the multi-core fibers are rotationally aligned, the multi-core fibers and the connector are fixed by an adhesive. Thereafter, end surfaces of the multi-core fibers protruding from the connector are polished so that the end surfaces of the multi-core fibers and an end surface of the connector are flush.

Meanwhile, when the multi-core fiber is rotationally aligned, the multi-core fiber is twisted between a holding portion in which the multi-core fiber is held and an end surface of the multi-core fiber in order to rotate the multi-core fiber around the central axis. Due to the twist of the multi-core fiber, rotational torque is generated on the end surface of the multi-core fiber. Due to the rotational torque generated on the end surface, the posture of the multi-core fiber around the central axis (specifically, a position of a core on the end surface of the multi-core fiber) fluctuates during a period from when the multi-core fiber is rotationally aligned to when all the multi-core fibers are collectively bonded to the connector. As a result, the position of the core on the end surface of the multi-core fiber deviates from a desired position, and a coupling loss between the optical connector and an external optical device such as an optical waveguide circuit increases. Thus, there is room for improving a method for manufacturing an optical fiber splicing component such as an optical connector from the above viewpoint.

DESCRIPTION OF EMBODIMENTS

Embodiments will be described.

(1) A method for manufacturing an optical fiber splicing component, including: preparing a plurality of optical fibers each including a glass fiber including a core and a cladding covering the core, and a resin coating covering the glass fiber, an end portion of the glass fiber being exposed from the resin coating; mounting the plurality of glass fibers on an optical fiber holding member so that the plurality of glass fibers exposed from the resin coating are arranged in a first direction and protrude outward from the optical fiber holding member; adjusting and fixing postures of the plurality of glass fibers around respective central axes; and collectively bonding two or more glass fibers among the plurality of glass fibers and the optical fiber holding member with an adhesive.

According to the manufacturing method of the aspect (1), it is possible to reduce rotational torque of the end surface of the glass fiber caused by twisting of the optical fiber. In this way, it is possible to prevent a situation in which the posture of the glass fiber (specifically, a position of the core on the end surface of the glass fiber) around the central axis fluctuates during a period from when the glass fiber is rotationally aligned to when all of the plurality of glass fibers are collectively bonded to the optical fiber holding member. As a result, it is possible to prevent the position of the core on the end surface of the glass fiber from deviating from a desired position set by the rotational alignment, and it is possible to prevent a situation in which a coupling loss between the optical fiber splicing component and an external optical component (for example, the optical waveguide circuit) increases. As described above, the method for manufacturing an optical fiber splicing component capable of improving an optical characteristic of the optical fiber splicing component is provided.

(2) The method for manufacturing an optical fiber splicing component according to aspect (1), in which the adjusting and fixing the postures includes in order, adjusting a posture of a first glass fiber among the plurality of glass fibers around a central axis, fixing the posture of the first glass fiber around the central axis, adjusting a posture of a second glass fiber adjacent to the first glass fiber around a central axis, and fixing the posture of the second glass fiber around the central axis.

According to the manufacturing method of aspect (2), it is possible to prevent a situation in which the posture of the first glass fiber around the central axis and the posture of the second glass fiber around the central axis fluctuate during the period from after the glass fiber is rotationally aligned to when all of the plurality of glass fibers are collectively bonded to the optical fiber holding member.

(3) The method for manufacturing an optical fiber splicing component according to aspect (1) or (2), in which the adjusting and fixing the postures includes fixing the plurality of glass fibers to the optical fiber holding member.

According to the manufacturing method of aspect (3), it is possible to prevent the situation in which the posture of the glass fiber around the central axis fluctuates during the period from after the glass fiber is rotationally aligned to when all of the plurality of glass fibers are collectively bonded to the optical fiber holding member. Further, according to the present manufacturing method, since it is not necessary to separately prepare a fixing substrate that fixes the glass fiber, it is possible to simplify manufacturing steps of the optical fiber splicing component.

(4) The method for manufacturing an optical fiber splicing component according to aspect (1) or (2), in which the adjusting and fixing the postures includes fixing portions of the plurality of glass fibers protruding outward from the optical fiber holding member to a fixing substrate between end surfaces of the plurality of glass fibers and the optical fiber holding member, and the manufacturing method further includes cleaving the plurality of glass fibers between the fixing substrate and the optical fiber holding member.

According to the manufacturing method of aspect (4), since the posture of the glass fiber around the central axis is fixed in the vicinity of the end surface of the glass fiber, it is possible to effectively reduce the rotational torque of the end surface of the glass fiber caused by the twisting of the optical fiber. Therefore, it is possible to more effectively prevent the situation in which the posture of the glass fiber around the central axis fluctuates.

(5) The method for manufacturing an optical fiber splicing component, in which the adjusting and fixing the postures includes fixing the plurality of glass fibers to the optical fiber holding member in the case of the manufacturing method of aspect (3), or to the fixing substrate in the case of the manufacturing method of aspect (4), with the adhesive (for example, an ultraviolet curable adhesive or a thermosetting adhesive).

According to the manufacturing method of aspect (5), the glass fiber can be relatively easily and quickly fixed to the optical fiber holding member or the fixing substrate.

(6) The method for manufacturing an optical fiber splicing component, in which the adjusting and fixing the postures includes fixing the plurality of glass fibers to the optical fiber holding member in the case of the manufacturing method of aspect (3), or to the fixing substrate in the case of the manufacturing method of aspect (4) by laser welding.

According to the manufacturing method of aspect (6), the glass fiber can be firmly fixed to the optical fiber holding member or the fixing substrate.

(7) The method for manufacturing an optical fiber splicing component, in which the adjusting and fixing the postures includes fixing the plurality of glass fibers to the optical fiber holding member in the case of the manufacturing method of aspect (3), or to the fixing substrate in the case of the manufacturing method of aspect (4) by mechanical fixing.

According to the manufacturing method of aspect (7), the glass fiber can be reliably fixed to the optical fiber holding member or the fixing substrate. Further, when the rotational alignment of the glass fiber is restarted, the fixing between the glass fiber and the optical fiber holding member or the fixing substrate can be released.

(8) The method for manufacturing an optical fiber splicing component according to any one of aspects (1) to (7), in which the optical fiber holding member includes a holding substrate having a plurality of groove portions each holding a corresponding one of the plurality of glass fibers, and a lid portion facing the holding substrate with the plurality of glass fibers interposed therebetween.

According to the manufacturing method of aspect (8), it is possible to prevent the situation in which the posture of the glass fiber around the central axis fluctuates during the period from after the glass fiber is rotationally aligned to when all of the plurality of glass fibers are collectively bonded to the holding substrate and the lid portion.

(9) The method for manufacturing an optical fiber splicing component according to any one of aspects (1) to (7), in which the optical fiber holding member is a block having a plurality of hole portions each holding a corresponding one of the plurality of glass fibers.

According to the manufacturing method of aspect (9), it is possible to prevent the situation in which the posture of the glass fiber around the central axis fluctuates during the period from after the glass fiber is rotationally aligned to when all of the plurality of glass fibers are collectively bonded to the block.

(10) The method for manufacturing an optical fiber splicing component according to any one of aspects (1) to (9), in which the optical fiber is a multi-core fiber, a polarization maintaining fiber, or a bundle fiber.

When the optical fiber is the multi-core fiber, the polarization maintaining fiber, or the bundle fiber, accuracy of the rotational alignment of the optical fiber is important. In this regard, according to the manufacturing method of the present disclosure, since it is possible to prevent the situation in which the posture of the glass fiber around the central axis fluctuates, it is possible to prevent the situation in which the coupling loss between the optical fiber splicing component and the external optical component (for example, the optical waveguide circuit) increases. Therefore, the method for manufacturing an optical fiber splicing component capable of improving the optical characteristic of the optical fiber splicing component is provided.

Advantageous Effects of Present Disclosure

According to the present disclosure, it is possible to provide a method for manufacturing an optical fiber splicing component capable of improving an optical characteristic of the optical fiber splicing component.

Details of Embodiments

Hereinafter, embodiments of the present disclosure will be described with reference to the drawings. Ratios of dimensions of respective members illustrated in the drawings may be different from actual ratios of the dimensions of the respective members for convenience of description. Further, in the present disclosure, an X-axis direction, a Y-axis direction, and a Z-axis direction set for an optical fiber splicing component 1 shown in FIG. 1 will be referred to as appropriate. Each of the X-axis direction, the Y-axis direction, and the Z-axis direction is perpendicular to the remaining two directions.

The optical fiber splicing component 1 functions as an optical fiber array including a plurality of optical fibers 2. When the optical fibers of the optical fiber splicing component 1 are optically spliced to another optical fiber, the optical fiber splicing component 1 functions as an optical connector.

FIG. 1 is a perspective view showing the optical fiber splicing component 1. The optical fiber splicing component 1 includes the plurality of optical fibers 2 (twelve optical fibers 2 in FIG. 1) arranged in the X-axis direction (first direction), and an optical fiber holding member 3 that holds the plurality of optical fibers 2. The optical fibers 2 are arranged in the X-axis direction in a state of being separated from each other. Each of the optical fibers 2 includes a glass fiber 20 and a resin coating 21 covering the glass fiber 20.

Figure 2:
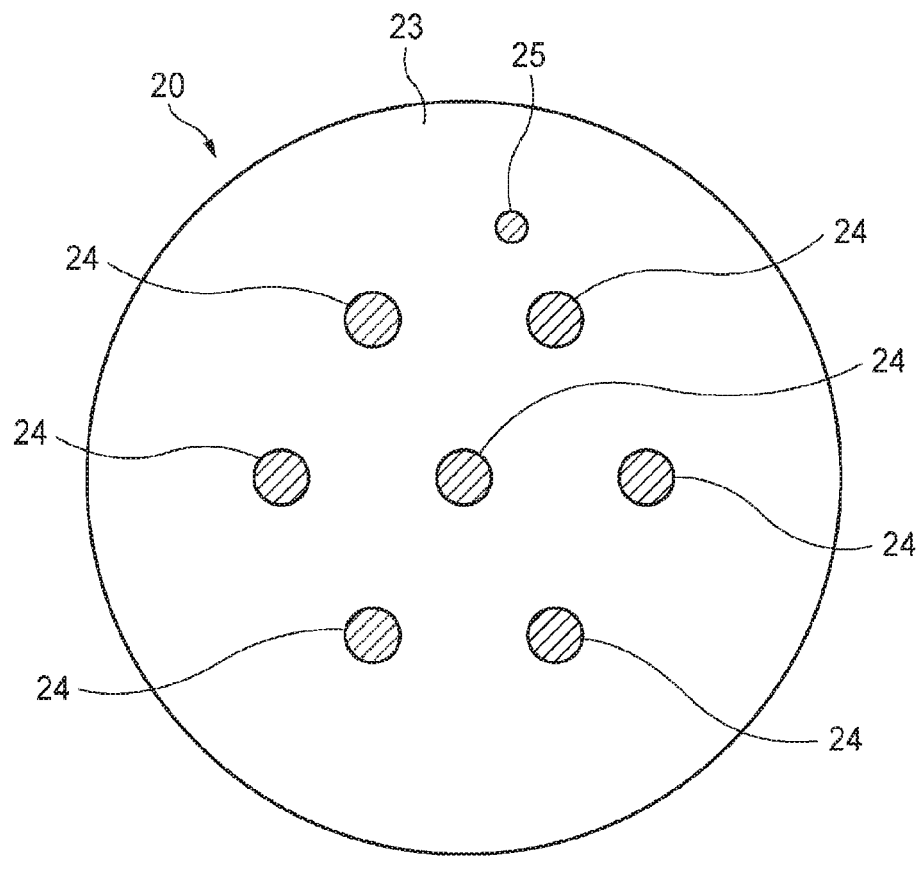
FIG. 2 is a view showing a cross section of a glass fiber in the optical fiber splicing component of FIG. 1.

FIG. 2 is a view showing a cross section perpendicular to a central axis of the glass fiber 20. The glass fiber 20 is a multi-core fiber having a structure that is not axis-symmetric in the cross section perpendicular to the central axis. As described above, since each of the optical fibers 2 has a structure that is not axis-symmetric with respect to the central axis, it is necessary to adjust (rotationally align) a posture of the optical fiber 2 around the central axis.

The glass fiber 20 includes a plurality of cores 24 through which signal light propagates, a marker 25, and a cladding 23 covering the plurality of cores 24 and the marker A refractive index of each of the cores 24 is larger than a refractive index of the cladding 23. A refractive index of the marker 25 is different from the refractive index of the cladding 23. The marker 25 is used in a rotational alignment step of the optical fibers 2, which will be described later.

As shown in FIG. 1, in the optical fibers 2, end portions of the glass fibers 20 are exposed from the resin coating 21. The optical fiber holding member 3 holds the plurality of glass fibers 20 so that the plurality of glass fibers 20 exposed from the resin coating 21 are arranged in the X-axis direction. The optical fiber holding member 3 includes a holding substrate 4 and a lid portion 5 facing the holding substrate 4 with the plurality of glass fibers interposed therebetween. The holding substrate 4 is provided with a plurality of V-shaped groove portions 46 (see FIG. 4) each holding the corresponding glass fiber 20. The lid portion the glass fibers 20, and the holding substrate 4 are fixed to one another via an adhesive. Further, end surfaces of the glass fibers 20, an end surface 51 of the lid portion 5, and an end surface 41 of the holding substrate 4 are flush.

First Embodiment

Next, a method for manufacturing the optical fiber splicing component 1 according to a first embodiment of the present disclosure will be described with reference to FIGS. 3 to 7. Hereinafter, for convenience of description, four optical fibers 2 among the twelve optical fibers 2 are referred to as optical fibers 2a to 2d, and the glass fibers 20 of the optical fibers 2a to 2d are referred to as glass fibers 20a to 20d.

Figure 3:
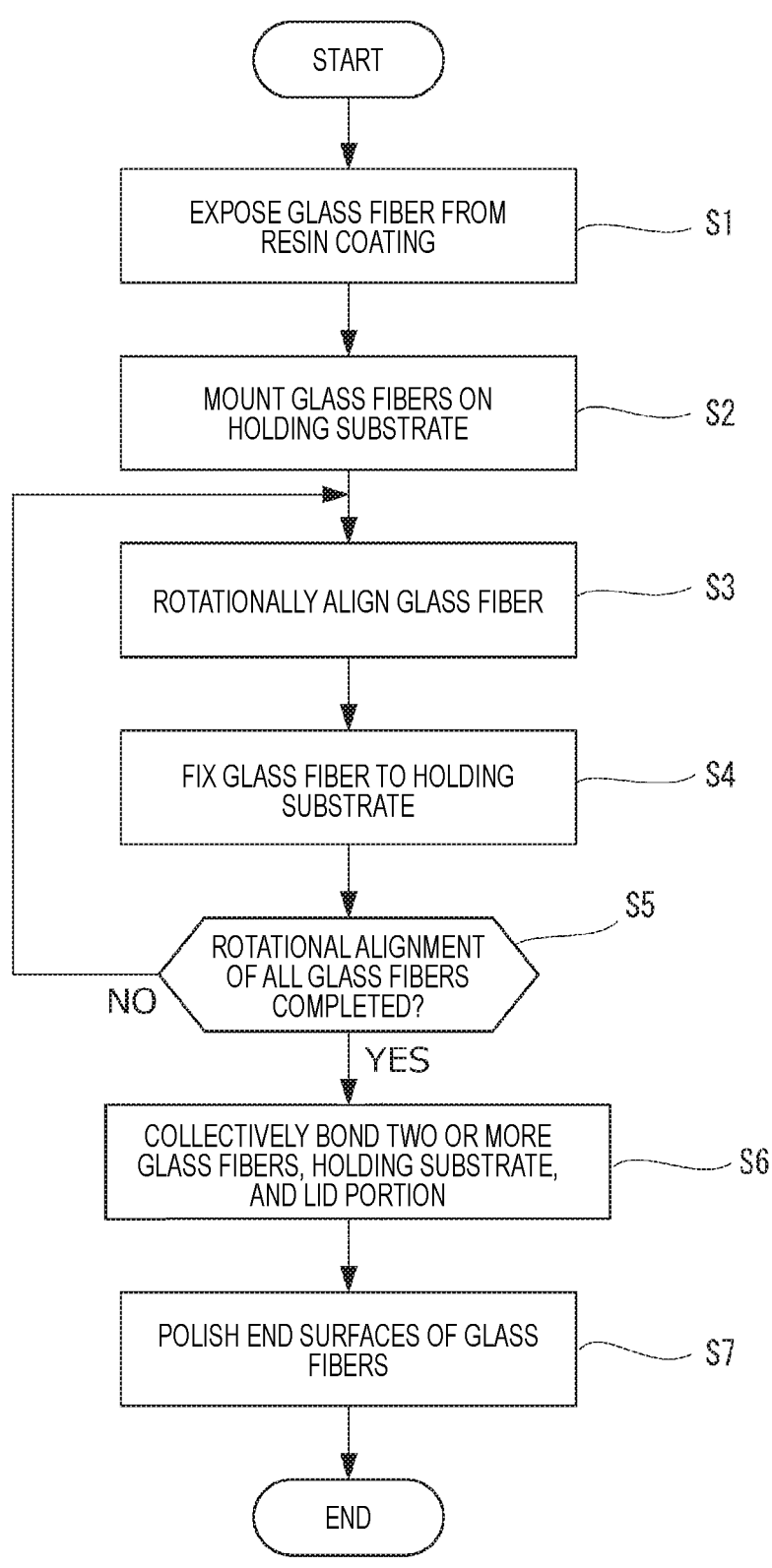
FIG. 3 is a flowchart illustrating the method for manufacturing the optical fiber splicing component according to a first embodiment of the present disclosure.

FIG. 3 is a flowchart illustrating the first embodiment of the method for manufacturing an optical fiber splicing component. In step S1, the end portions of the glass fibers 20 are exposed from the resin coating 21 by using a predetermined tool. In the first embodiment, the plurality of optical fibers 2 may be a plurality of optical fibers that are not bonded to one another, or may be a plurality of optical fibers provided in a fiber ribbon with fiber adhesive parts and non-adhesive parts. In the fiber ribbon with fiber adhesive parts and non-adhesive parts, adjacent optical fibers are intermittently bonded to each other along a longitudinal direction.

Figure 4:
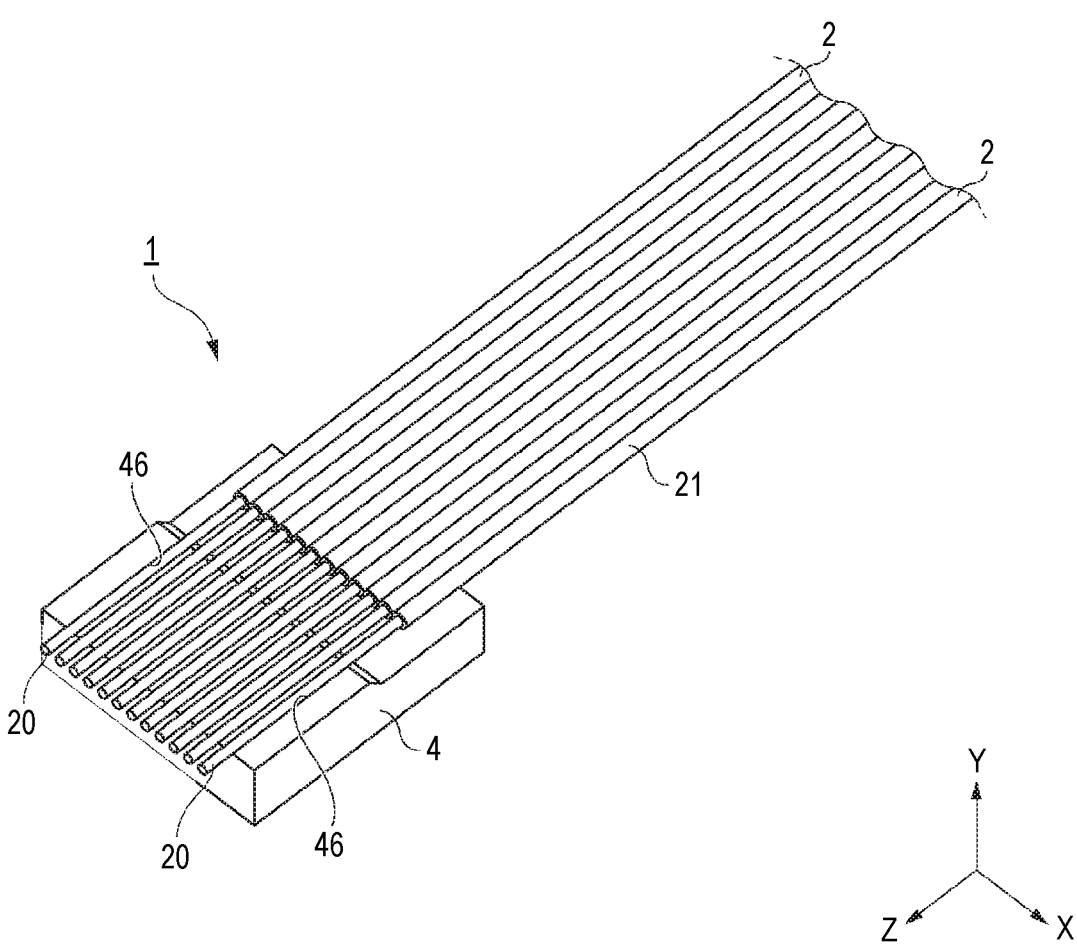
FIG. 4 is a perspective view showing a state in which the glass fibers are mounted on a holding substrate in the method for manufacturing the optical fiber splicing component according to the first embodiment.

FIG. 4 is a view showing a state in which the glass fibers 20 are mounted on the holding substrate 4. In step S2, the glass fibers 20 exposed from the resin coating 21 are mounted on the holding substrate 4. The glass fibers 20 are mounted on the holding substrate 4 so that the glass fibers 20 protrude outward from the holding substrate 4 in the Z-axis direction when arranged in the X-axis direction.

Figure 5:
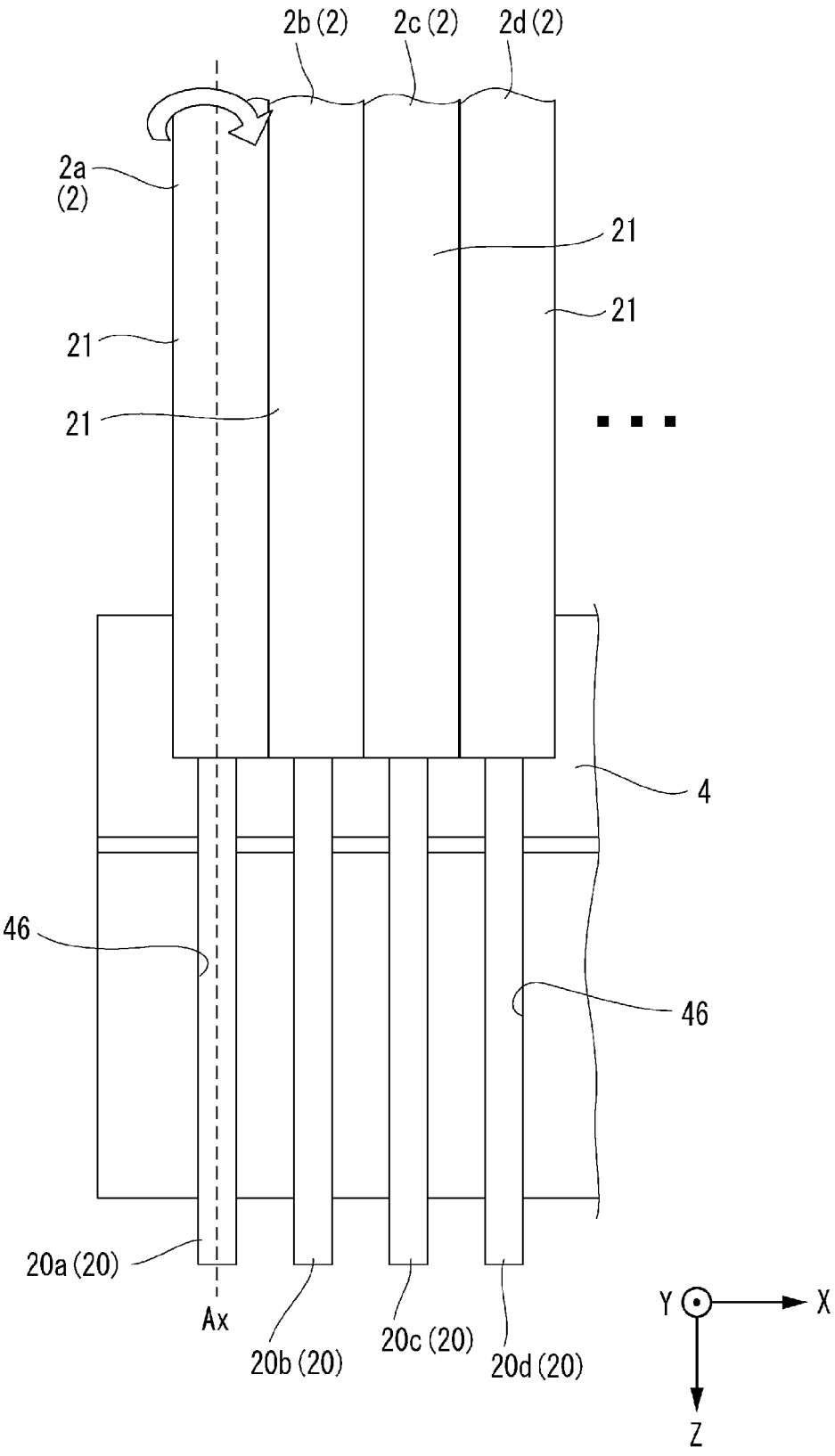
FIG. 5 is a view showing a state in which one of the glass fibers is rotationally aligned in the method for manufacturing the optical fiber splicing component according to the first embodiment.

FIG. 5 is a view showing a state in which one of the glass fibers 20 is rotationally aligned. First, a posture of the glass fiber 20a (an example of a first glass fiber) of the optical fiber 2a (in other words, a position of the core 24 on the end surface of the glass fiber 20a) around a central axis Ax is adjusted (step S3). In the rotational alignment step of step S3, for example, the end surface of the glass fiber 20 protruding from the holding substrate 4 may be imaged by an imaging device such as a camera. Thereafter, a rotational alignment device (not shown) may automatically adjust the posture of the glass fiber 20 around the central axis Ax based on an image indicating the end surface of the glass fiber 20 acquired by the imaging device. In this regard, the rotational alignment device may adjust the posture of the glass fiber 20 around the central axis Ax so that a position of the marker 25 (see FIG. 2) of the glass fiber 20 is a predetermined position. The rotational alignment device may adjust the posture of the glass fiber 20 of the central axis Ax while holding the resin coating 21 of the optical fiber 2. In this way, rotational positions of the plurality of cores 24 are adjusted to desired rotational positions through the rotational alignment step of step S3.

When rotational alignment of the glass fiber 20 is performed, the glass fiber 20 rotates around the central axis Ax. Therefore, the optical fiber 2 is twisted between a holding portion of the optical fiber 2 held by the rotational alignment device and the end surface of the glass fiber 20. The twisting of the optical fiber 2 generates rotational torque on the end surface of the glass fiber 20.

Figure 6:
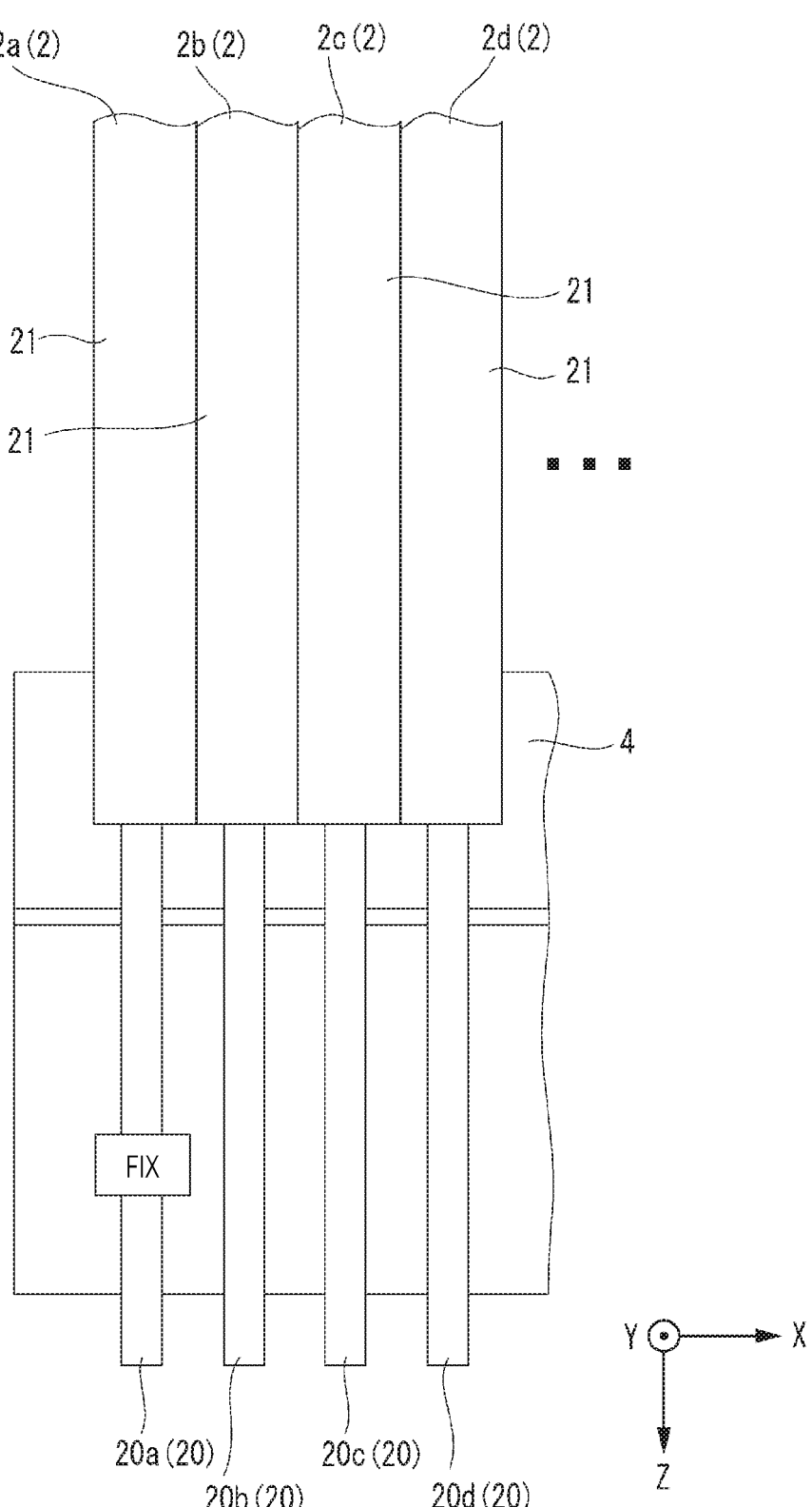
FIG. 6 is a view showing a state in which one of the glass fibers is fixed to the holding substrate in the method for manufacturing the optical fiber splicing component according to the first embodiment.

FIG. 6 is a view showing a state in which one of the glass fibers 20 is fixed to the holding substrate 4. In order to fix the posture of the glass fiber 20a of the optical fiber 2a around the central axis Ax, the glass fiber 20a of which the posture around the central axis Ax is adjusted is fixed to the holding substrate 4 (step S4). An example of a fixing method between the glass fiber 20 and the holding substrate 4 includes the following method.

(1) Fixing Method Using Adhesive

The glass fiber 20 may be fixed to the holding substrate 4 by the adhesive. In this case, an ultraviolet curable adhesive or a thermosetting adhesive may be used as the adhesive. For example, in the case in which the ultraviolet curable adhesive is used as the adhesive, the ultraviolet curable adhesive may be applied in advance between the holding substrate 4 and the glass fibers 20 before step S3, Thereafter, ultraviolet rays may be emitted to the ultraviolet curable adhesive applied to the rotationally aligned glass fiber 20. In this way, the rotationally aligned glass fiber 20 is fixed to the holding substrate 4 by the ultraviolet curable adhesive. After step S3, the ultraviolet curable adhesive may be applied between the rotationally aligned glass fiber 20 and the holding substrate 4.

When the thermosetting adhesive is used as the adhesive, the thermosetting adhesive may be applied in advance between the holding substrate 4 and the glass fibers 20 before step S3. Thereafter, the thermosetting adhesive applied to the rotationally aligned glass fiber 20 may be heated through a heater or laser irradiation. In this way, the rotationally aligned glass fiber 20 is fixed to the holding substrate 4 by the thermosetting adhesive. After step S3, the thermosetting adhesive may be applied between the rotationally aligned glass fiber 20 and the holding substrate 4.

When the adhesive is used as a unit of fixing the glass fiber 20 to the holding substrate 4, the glass fiber 20 can be relatively easily and quickly fixed to the holding substrate 4.

(2) Fixing Method Using Laser Welding

The glass fiber 20 may be fixed to the holding substrate 4 by laser welding. In this case, it is preferable that a melting point of a material constituting the holding substrate 4 is lower than a melting point of a material (for example, quartz glass or tempax glass) constituting the cladding 23 of the glass fiber 20. Further, a laser used for the laser welding is, for example, a CO2 laser, a YAG laser, a fiber laser, or a disk laser.

When the laser welding is used a method for fixing the glass fiber 20 to the holding substrate 4, the glass fiber 20 can be firmly fixed to the holding substrate 4.

(3) Fixing Method Using Mechanical Fixing Unit

The glass fiber 20 may be fixed to the holding substrate 4 by a mechanical fixing unit. The mechanical fixing unit is, for example, a metal or resin fixing member. The mechanical fixing unit is mounted on the holding substrate 4 in a manner of facing the rotationally aligned glass fiber 20. When the mechanical fixing unit is mounted on the holding substrate 4, the glass fiber 20 is pressed toward the groove portion 46 by the mechanical fixing unit in a state of being disposed in the groove portion 46 of the holding substrate 4. In this case, the glass fiber 20 comes into contact with the V-shaped groove portion 46 at two points, and comes into contact with the mechanical fixing unit at one point. A shape of the mechanical fixing unit is not particularly limited, and the mechanical fixing unit is preferably removable from the holding substrate 4.

When the mechanical fixing unit is used as the unit of fixing the glass fiber 20 to the holding substrate 4, the glass fiber 20 can be reliably fixed to the holding substrate 4. Further, when the rotational alignment of the glass fiber 20 is performed again, the fixing between the glass fiber 20 and the holding substrate 4 can be released.

The position at which the glass fiber 20 and the holding substrate 4 are fixed is not particularly limited, and the fixing position is preferably close to the end surface of the glass fiber 20 in order to reduce the rotational torque generated in the end surface of the glass fiber 20.

Figure 7:
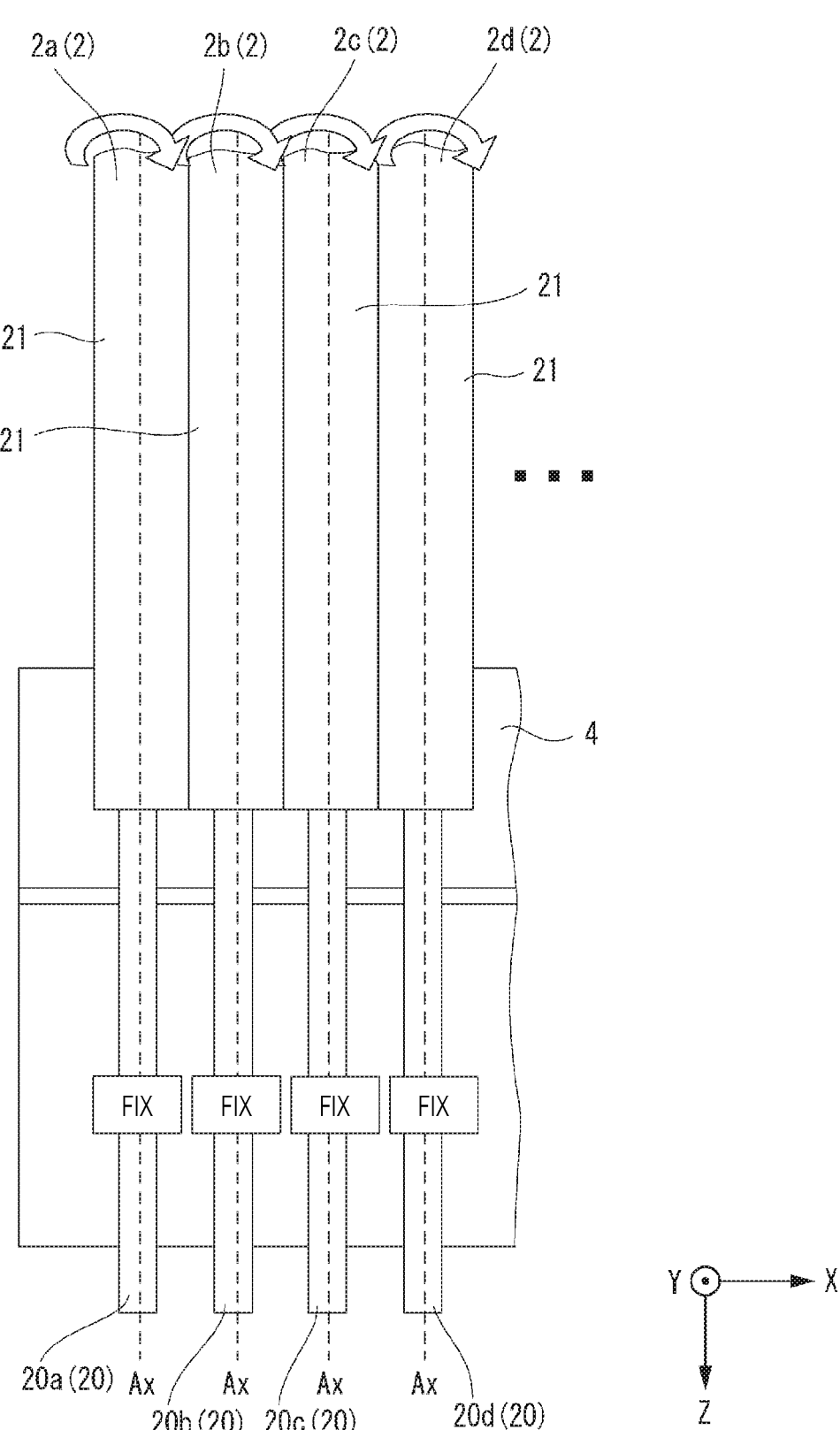
FIG. 7 is a view showing a state in which each glass fiber of which a posture around a central axis is adjusted is fixed to the holding substrate in the method for manufacturing the optical fiber splicing component according to the first embodiment.

FIG. 7 is a view showing a state in which each glass fiber 20 of which the posture around the central axis is adjusted is fixed to the holding substrate 4. Next, step S3 and step S4 are repeatedly executed until the rotational alignment of all the glass fibers 20 is completed (step S5). Specifically, after a posture of the glass fiber 20h (an example of a second glass fiber) of the optical fiber 2b adjacent to the optical fiber 2a around the central axis Ax is adjusted, the glass fiber 20b is fixed to the holding substrate 4 in order to fix the posture of the glass fiber 20b around the central axis Ax. Next, after a posture of the glass fiber 20c of the optical fiber 2c adjacent to the optical fiber 2b around the central axis Ax is adjusted, the glass fiber 20c is fixed to the holding substrate 4 in order to fix the posture of the glass fiber 20c around the central axis Ax. Further, after a posture of the glass fiber 20d of the optical fiber 2d adjacent to the optical fiber 2c around the central axis Ax is adjusted, the glass fiber 20d is fixed to the holding substrate 4 in order to fix the posture of the glass fiber 20d around the central axis Ax. Steps S3 and S4 are also executed on the remaining glass fibers 20.

In this way, after steps S3 and S4 are executed for all the glass fibers 20 (YES in step S5), two or more glass fibers among the glass fibers 20, the holding substrate 4, and the lid portion 5 are collectively bonded using the adhesive (step S6). Next, in step S7, the end surfaces of the glass fibers 20 are polished until the end surfaces of the glass fibers 20, the end surface 41 of the holding substrate 4, and the end surface 51 of the lid portion 5 are flush with one another. In this way, the optical fiber splicing component 1 shown in FIG. 1 is manufactured through manufacturing steps shown in FIG. 3.

According to the first embodiment, before all the glass fibers 20 are collectively bonded to the optical fiber holding member 3, the glass fibers 20 are fixed to the holding substrate 4 in order to fix the posture of the glass fiber 20 around the central axis Ax in step S4. Therefore, it is possible to reduce the rotational torque of the end surface of the glass fiber caused by the twisting of the optical fiber 2 at the time of the rotational alignment. In particular, a distance from the position where the glass fiber 20 and the holding substrate 4 are fixed to each other to the end surface of the glass fiber 20 is smaller than a distance from the holding portion of the optical fiber 2 held by the rotational alignment device to the end surface of the glass fiber 20. Therefore, the rotational torque of the end surface of the glass fiber 20 caused by the twisting of the optical fiber 2 can be reduced.

In this way, it is possible to prevent a situation in which the posture of the glass fiber 20 around the central axis Ax fluctuates during a period from when the glass fiber 20 is rotationally aligned to when all the glass fibers 20 are collectively bonded to the optical fiber holding member 3 by the adhesive. As a result, the position of the core 24 on the end surface of the glass fiber 20 is prevented from deviating from a desired position set by the rotational alignment. In this regard, the position of the core 24 of the glass fiber 20a which is rotationally aligned first is most likely to deviate from the desired position. On the other hand, according to the first embodiment, since the posture of the glass fiber 20a around the central axis Ax is fixed in step S4, the position of the core 24 of the glass fiber 20a is prevented from deviating from the desired position.

Therefore, it is possible to prevent a situation in which a coupling loss between the finally manufactured optical fiber splicing component 1 and an external optical component (for example, an optical waveguide circuit or an optical connector) increases. As described above, the method for manufacturing the optical fiber splicing component 1 capable of improving an optical characteristic of the optical fiber splicing component 1 is provided.

Further, according to the first embodiment, since it is not necessary to separately prepare a fixing substrate that fixes the posture of the glass fiber 20 around the central axis Ax, it is possible to simplify the manufacturing steps of the optical fiber splicing component 1.

Second Embodiment

Figure 8:
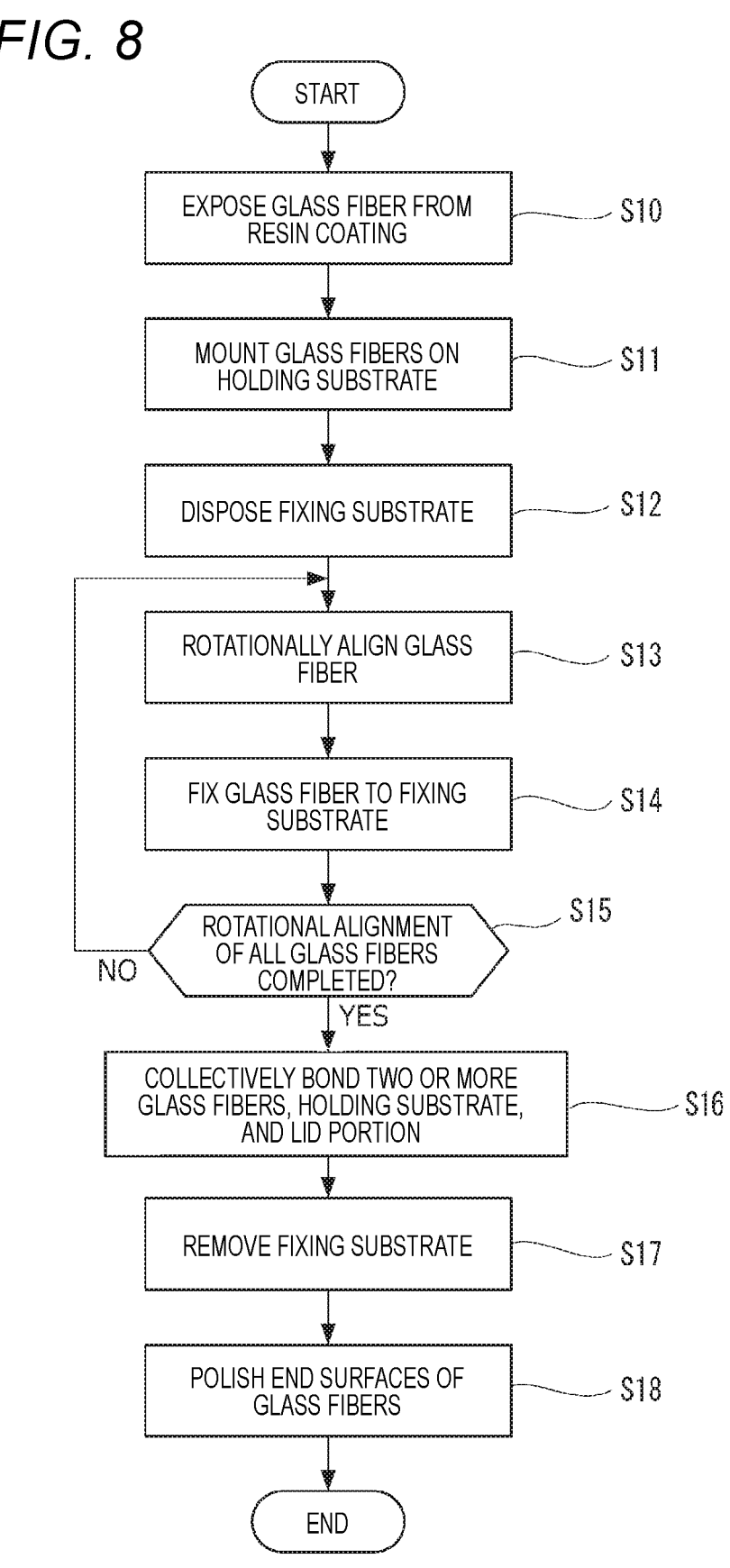
FIG. 8 is a flowchart illustrating a method for manufacturing an optical fiber splicing component according to a second embodiment of the present disclosure.

FIG. 8 is a flowchart illustrating a method for manufacturing an optical fiber splicing component according to a second embodiment. Steps S10 and S11 are the same as steps S1 and S2 in the first embodiment.

Figure 9:
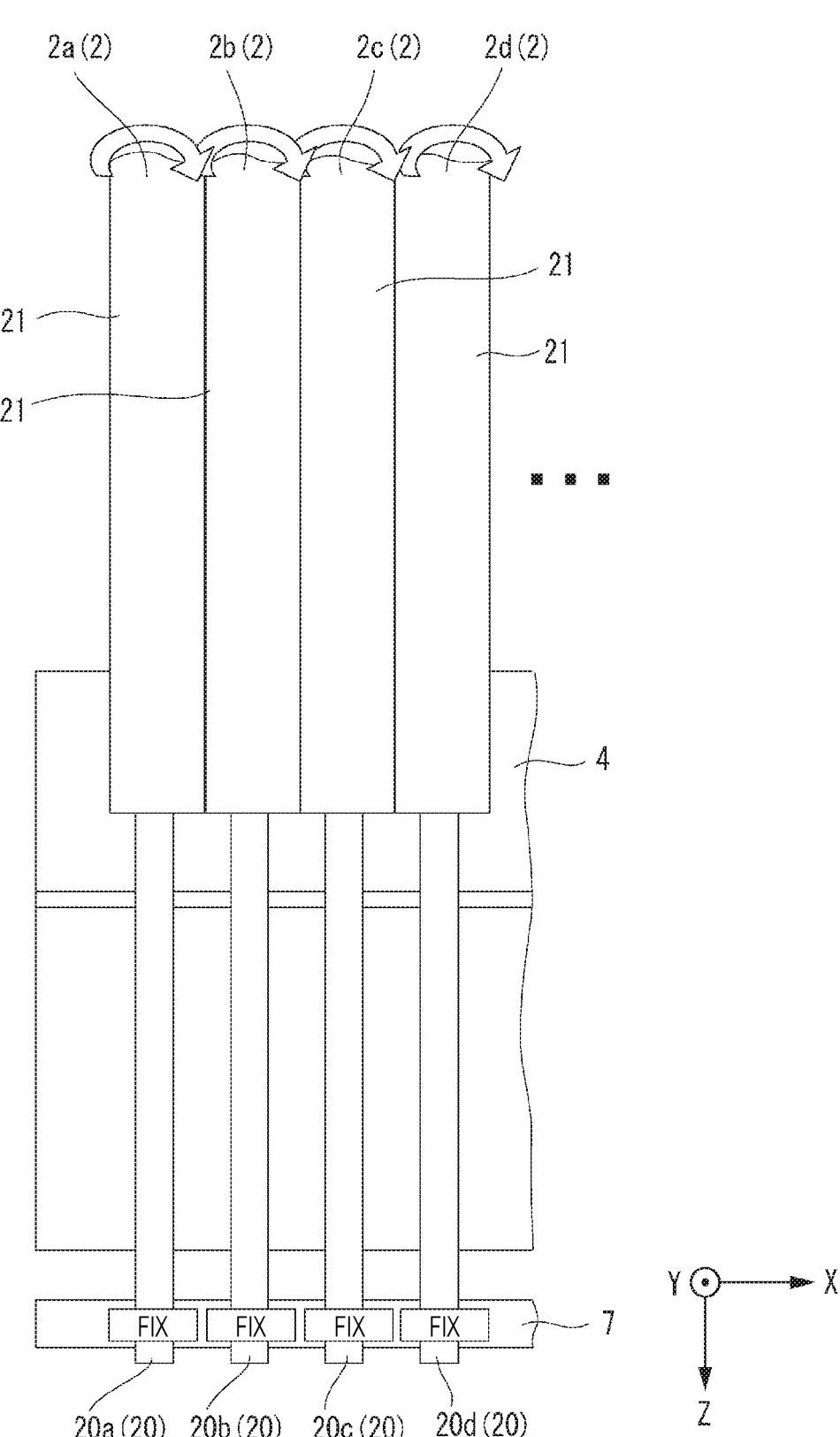
FIG. 9 is a view showing a state in which each glass fiber of which a posture around a central axis is adjusted is fixed to a fixing substrate in the method for manufacturing an optical fiber splicing component according to the second embodiment.

FIG. 9 is a view showing a state in which each glass fiber 20 of which a posture around the central axis Ax is adjusted is fixed to a fixing substrate 7. In step S12, the fixing substrate 7 is disposed between end surfaces of the glass fibers 20 and the holding substrate 4 of the optical fiber holding member 3 in the Z-axis direction. The fixing substrate 7 may be disposed so that a distance between the fixing substrate 7 and the end surface of the glass fiber 20 in the Z-axis direction is smaller than a distance between the fixing substrate 7 and the holding substrate 4. In particular, since the fixing substrate 7 and the holding substrate 4 are separated from each other, the fixing substrate 7 can be successfully removed in step S17.

Next, in step S13, a posture of the glass fiber 20a of the optical fiber 2a around the central axis Ax is first adjusted. Thereafter, in order to fix the posture of the glass fiber 20a around the central axis Ax, the glass fiber 20a of which the posture around the central axis Ax is adjusted is fixed to the fixing substrate 7 (step S14). As in the first embodiment, the glass fiber 20a may be fixed to the fixing substrate 7 with an adhesive, or may be fixed to the fixing substrate 7 by laser welding. Further, the glass fiber 20a may be fixed to the fixing substrate 7 by a mechanical fixing unit.

Next, steps S13 and S14 are repeatedly executed until the rotational alignment of all the glass fibers 20 is completed (step S15). Specifically, after a posture of the glass fiber 20b of the optical fiber 2b adjacent to the optical fiber 2a around the central axis Ax is adjusted, the glass fiber 20h is fixed to the fixing substrate 7 in order to fix the posture of the glass fiber around the central axis Ax. Next, after a posture of the glass fiber 20c of the optical fiber 2c adjacent to the optical fiber 2b around the central axis Ax is adjusted, the glass fiber 20c is fixed to the fixing substrate 7 in order to fix the posture of the glass fiber 20c around the central axis Ax. Further, after a posture of the glass fiber 20d of the optical fiber 2d adjacent to the optical fiber 2c around the central axis Ax is adjusted, the glass fiber 20d is fixed to the fixing substrate 7 in order to fix the posture of the glass fiber 20d around the central axis Ax.

In this way, after steps S13 and S14 are executed for all the glass fibers 20 (YES in step S15), two or more glass fibers among the glass fibers 20, the holding substrate 4, and the lid portion 5 are collectively bonded using the adhesive (step S16).

Figure 10:
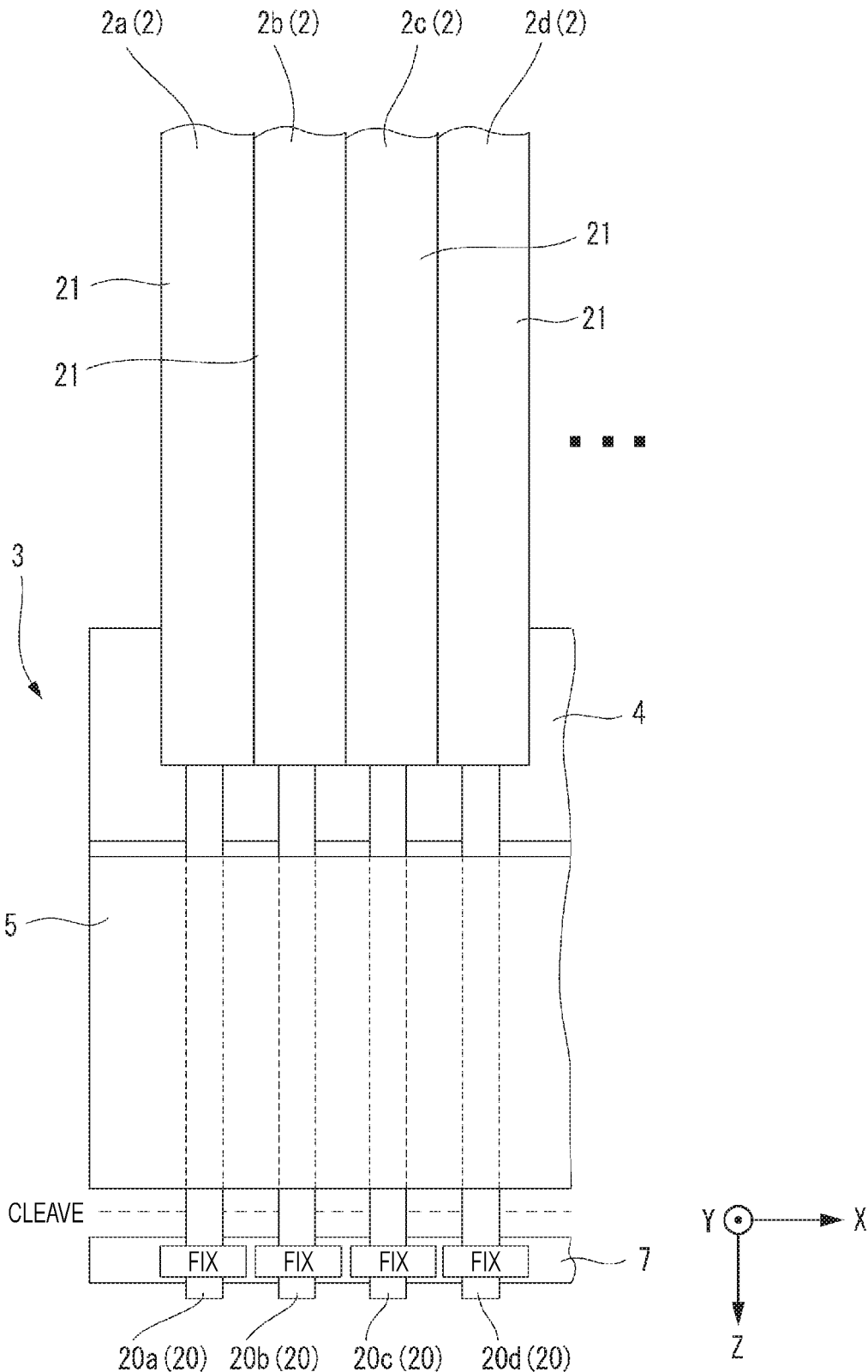
FIG. 10 is a view illustrating a step of removing the fixing substrate in the method for manufacturing an optical fiber splicing component according to the second embodiment.

FIG. 10 is a view illustrating step S17 of removing the fixing substrate 7. Next, in step S17, the fixing substrate 7 is removed. Specifically, the glass fibers 20 located between the fixing substrate 7 and the holding substrate 4 of the optical fiber holding member 3 in the Z-axis direction are cleaved by a cleaving tool. Thus, the fixing substrate 7 can be removed by cleaving the glass fibers 20, Next, in step S18, the end surfaces of the glass fibers 20 are polished until the end surfaces of the glass fibers 20, the end surface 41 of the holding substrate 4, and the end surface 51 of the lid portion 5 are flush with one another. In this way, the optical fiber splicing component 1 shown in FIG. 1 is manufactured through manufacturing steps shown in FIG. 8.

According to the second embodiment, before all the glass fibers 20 are collectively bonded to the optical fiber holding member 3, the end portions of the glass fibers 20 are fixed to the fixing substrate 7 in order to fix the postures of the glass fibers 20 around the respective central axes Ax in step S14. Therefore, it is possible to reduce rotational torque of the end surface of the glass fiber 20 caused by the twisting of the optical fiber 2 at the time of the rotational alignment. In particular, a distance from a position Where the glass fiber 20 and the fixing substrate 7 are fixed to each other to the end surface of the glass fiber 20 is smaller than the distance from a holding portion of the optical fiber 2 held by a rotational alignment device to the end surface of the glass fiber 20. In this regard, since the posture of the glass fiber 20 around the central axis Ax is fixed in the vicinity of the end surface of the glass fiber 20, it is possible to further reduce the rotational torque of the end surface of the glass fiber 20 caused by the twisting of the optical fiber 2.

In this way, it is possible to prevent the situation in which the posture of the glass fiber 20 around the central axis Ax fluctuates during the period from when the glass fiber 20 is rotationally aligned to when all the glass fibers 20 are collectively bonded to the optical fiber holding member 3 by the adhesive. As a result, a position of the core 24 on the end surface of the glass fiber 20 is prevented from deviating from a desired position set by the rotational alignment. Therefore, it is possible to prevent a situation in which a coupling loss between the finally manufactured optical fiber splicing component 1 and an external optical component (for example, an optical waveguide circuit or an optical connector) increases. As described above, the method for manufacturing the optical fiber splicing component 1 capable of improving an optical characteristic of the optical fiber splicing component 1 is provided.

(Modification of Optical Fiber Holding Member)

Figure 11:
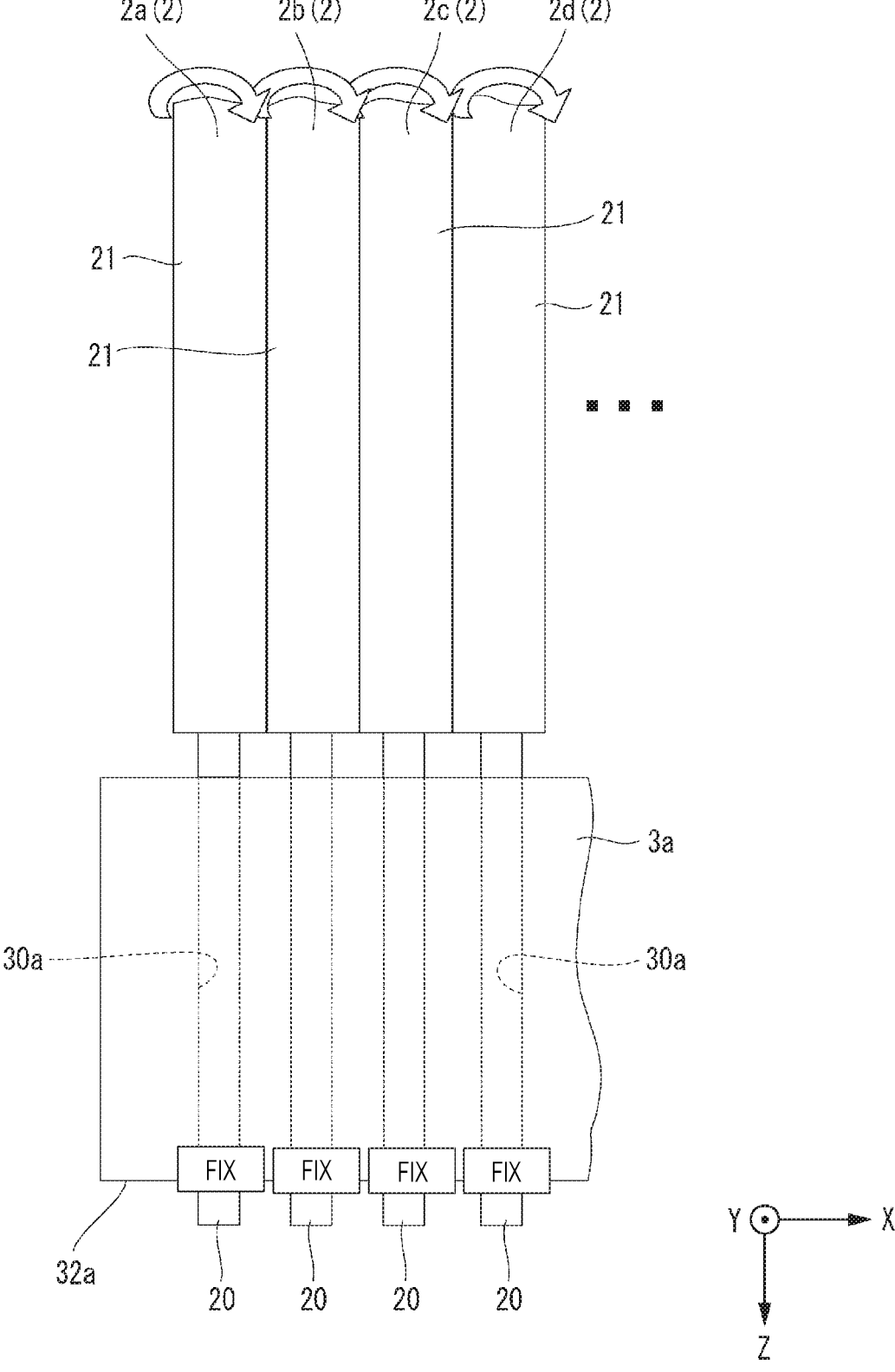
FIG. 11 is a view illustrating the method for manufacturing an optical fiber splicing component according to the first embodiment when an optical fiber holding member according to a modification is used for the optical fiber splicing component.

FIG. 11 is a view illustrating the method for manufacturing an optical fiber splicing component according to the first embodiment when an optical fiber holding member 3a according to a modification is used for the optical fiber splicing component. The optical fiber holding member 3a according, to the modification is a block having a plurality of hole portions 30a arranged in the X-axis direction. Each of the plurality of hole portions 30a extends in the Z-axis direction and holds a corresponding one of the plurality of glass fibers 20. When the glass fiber 20 is held by the optical fiber holding member 3a, the glass fiber 20 is inserted into the corresponding hole portion 30a in step S2 shown in FIG. 3. In this case, a tip portion of the glass fiber 20 protrudes outward from the optical fiber holding member 3a in the Z-axis direction. Thereafter, steps S3 and S4 are performed on all the glass fibers 20.

In step S4, the glass fiber 20 may be fixed to the optical fiber holding member 3a in the vicinity of an end surface 32a of the optical fiber holding member 3a. In particular, the glass fiber 20 may be fixed to the optical fiber holding member 3a by the adhesive (ultraviolet curable adhesive or thermosetting adhesive), or may be fixed to the optical fiber holding member 3a by the laser welding. For example, in the case in which the glass fiber 20 is fixed to the optical fiber holding member 3a by the ultraviolet curable adhesive, the ultraviolet curable adhesive is poured into the hole portion 30a before step S3. Thereafter, after the rotational alignment of the glass fiber 20 is performed, an ultraviolet curable resin present in the vicinity of the end surface 32a of the optical fiber holding member 3a is irradiated with the ultraviolet rays. In this way, the glass fiber 20 is fixed to the optical fiber holding member 3a by the ultraviolet curable adhesive in the vicinity of the end surface 32a.

In this way, after steps S3 and S4 are executed for all the glass fibers 20, the steps S6 and S7 are executed. In step SE, the adhesive is poured into the hole portion 30a in a state in which the glass fiber 20 inserted into the hole portion 30a is fixed to the optical fiber holding member 3a. In this way, the glass fiber 20 is bonded to the optical fiber holding member 3a. Thereafter, the end surfaces of the glass fibers 20 are polished until the end surfaces of the glass fibers 20 are flush with the end surface 32a of the optical fiber holding member 3a. As a result, an optical fiber splicing component including the optical fiber holding member 3a is manufactured.

Figure 12:
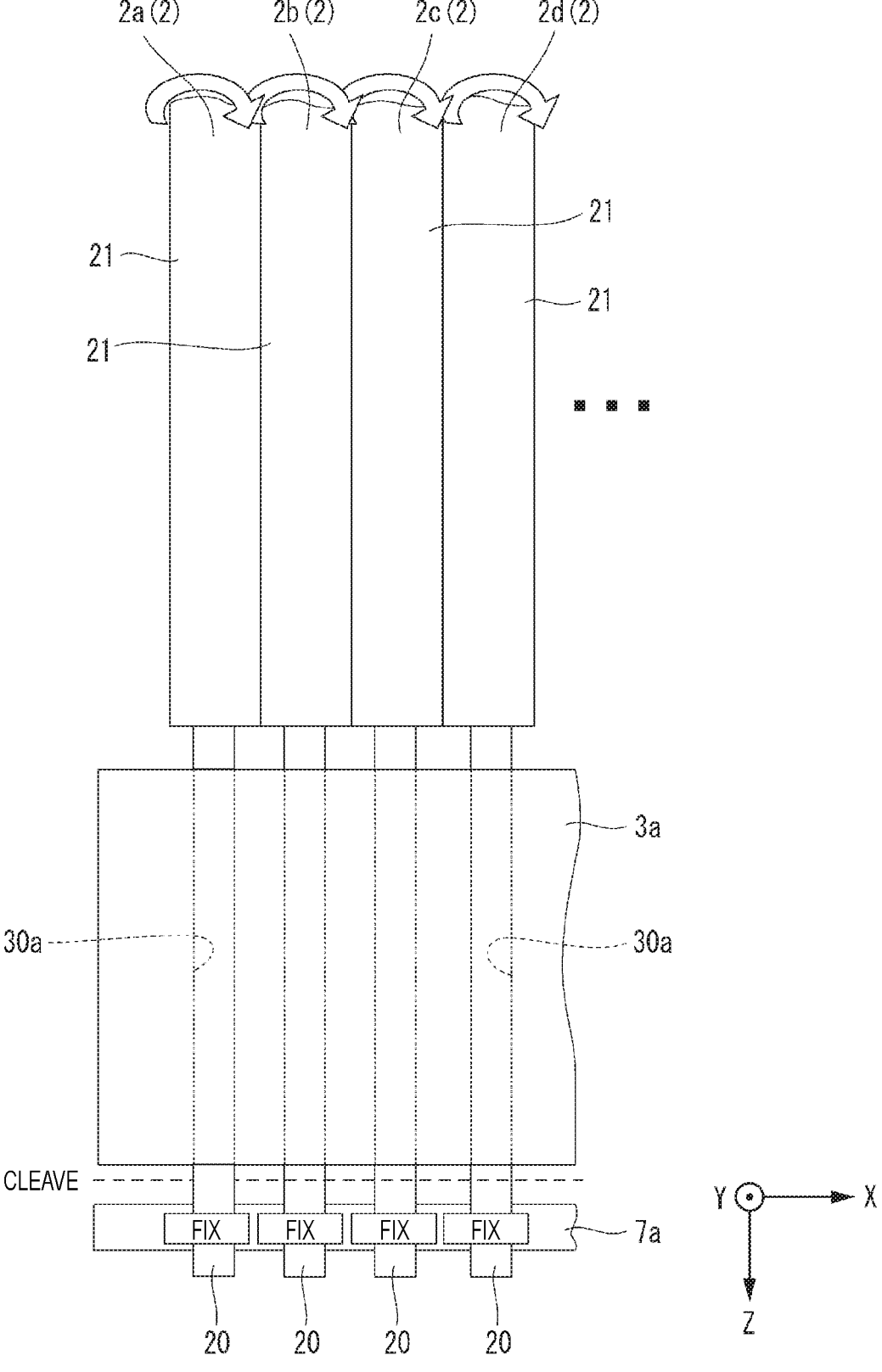
FIG. 12 is a view illustrating the method for manufacturing an optical fiber splicing component according to the second embodiment when the optical fiber holding member according to the modification is used for the optical fiber splicing component.

FIG. 12 is a view illustrating the method for manufacturing an optical fiber splicing component according to the second embodiment when the optical fiber holding member 3a according to the modification is used for the optical fiber splicing component. In step S11 of FIG. 8, each glass fiber 20 is inserted into the corresponding hole portion 30a, In this case, the tip portion of the glass fiber 20 protrudes outward from the optical fiber holding member 3a in the Z-axis direction. Thereafter, a fixing substrate 7a is disposed between the optical fiber holding member 3a and the end surfaces of each glass fibers 20 in the Z-axis direction (step S12). Next, steps S13 and S14 are performed on all the glass fibers 20.

In step S14, the end portion of the glass fiber 20 protruding outward from the optical fiber holding member 3a is fixed to the fixing substrate 7a. In particular, the glass fiber 20 may be fixed to the fixing substrate 7a by the adhesive (ultraviolet curable adhesive or thermosetting adhesive), or may be fixed to the fixing substrate 7a by the laser welding.

Further, the glass fiber 20 may be fixed to the fixing substrate 7a by the mechanical fixing unit.

In this way, after steps S13 and S14 are executed for all the glass fibers 20, steps S16 to S18 are executed. As a result, the optical fiber splicing component including the optical fiber holding member 3a is manufactured.

Although the embodiments have been described above, it goes without saying that the technical scope of the present invention should not be construed as being limited by the description of the embodiments. It is to be understood by those skilled in the art that the embodiments are merely examples, and various modifications can be made within the scope of the inventions described in the claims. As described above, the technical scope of the present invention should be determined based on the scope of the inventions described in the claims and an equivalent scope thereof.

In the present disclosure, the multi-core fiber is used as an example of the optical fiber 2, and the optical fiber 2 may be a polarization maintaining fiber, or a bundle fiber. The polarization maintaining fiber includes a pair of stress applying portions, a core disposed between the pair of stress applying portions and through which signal light propagates, and a cladding covering the pair of stress applying portions and the core. When the polarization maintaining fiber is used as the optical fiber 2, crosstalk between the optical fiber splicing component 1 and another optical component optically spliced to each other can be reduced. Further, the bundle fiber is formed by a bundle of single-core fibers.

REFERENCE SIGNS LIST

1 optical fiber splicing component
2, 2a, 2b, 2c, 2d optical fiber
3, 3a optical fiber holding member
4 holding substrate
5 lid portion
7 fixing substrate
20, 20a, 20b, 20c, 20d glass fiber
21 resin coating
23 cladding
24 core
25 marker
30a hole portion
32a end surface
41 end surface
46 groove portion
51 end surface

The invention claimed is:

1. A method for manufacturing an optical fiber splicing component, comprising:

preparing a plurality of optical fibers, each optical fiber having a glass fiber that includes a core and a cladding covering the core, a resin coating covering the glass fiber, and an end portion of the glass fiber is exposed from the resin coating;

mounting the plurality of glass fibers on an optical fiber holding member including a holding substrate holding the plurality of glass fibers and a lid portion facing the holding substrate with the plurality of glass fibers interposed therebetween so that the plurality of glass fibers exposed from the resin coating are arranged in a first direction and the end portions of the plurality of glass fibers protrude outward from the optical fiber holding member;

adjusting and fixing postures of the plurality of glass fibers around respective central axes, including:

adjusting a posture of a first glass fiber of a plurality of glass fibers around a central axis;

then fixing a vicinity portion of an end surface of the first glass fiber to the holding substrate to hold the posture of the first glass fiber around the central axis;

then adjusting a posture of a second glass fiber of the plurality of glass fibers adjacent to the first glass fiber around the central axis;

then fixing a vicinity portion of an end surface of the second glass fiber to the fixing holding substrate to hold the posture of the second glass fiber around the central axis;

then sequentially repeating the adjusting and the fixing for each of the plurality of glass fibers; and finally collectively bonding two or more glass fibers among the plurality of glass fibers and the optical fiber holding member with an adhesive.

2. The method for manufacturing an optical fiber splicing component according to claim 1, wherein the adjusting of the postures is performed so that a position of a marker of each of the plurality of glass fibers is a predetermined position based on an image indicating the end surface of the glass fiber.

3. The method for manufacturing an optical fiber splicing component according to claim 1, wherein the holding substrate is provided with a plurality of V-shaped groove portions each of which holds one of the plurality of glass fibers.

4. The method for manufacturing an optical fiber splicing component according to claim 1, wherein the adjusting and fixing the postures includes fixing the plurality of glass fibers to the holding substrate with the adhesive.

5. The method for manufacturing an optical fiber splicing component according to claim 4, wherein the adhesive is an ultraviolet curable adhesive or a thermosetting adhesive.

6. The method for manufacturing an optical fiber splicing component according to claim 1, wherein the adjusting and fixing the postures includes fixing the plurality of glass fibers to the holding substrate by laser welding.

7. The method for manufacturing an optical fiber splicing component according to claim 1, wherein the adjusting and fixing the postures includes fixing the plurality of glass fibers to the holding substrate by a mechanical fixing unit.

8. The method for manufacturing an optical fiber splicing component according to claim 1, wherein after collectively bonding, the end surfaces of the plurality of glass fibers are polished until the end surfaces of the plurality of glass fibers, an end surface of the holding substrate, and an end surface of the lid portion are flush with one another.

9. A method for manufacturing an optical fiber splicing component, comprising:

preparing a plurality of optical fibers, each optical fiber having a glass fiber that includes a core and a cladding covering the core, a resin coating covering the glass fiber, and an end portion of the glass fiber is exposed from the resin coating;

mounting the plurality of glass fibers on an optical fiber holding member including a holding substrate holding the plurality of glass fibers and a lid portion facing the holding substrate with the plurality of glass fibers interposed therebetween so that the plurality of glass fibers exposed from the resin coating are arranged in a first direction and the end portions of the plurality of glass fibers protrude outward from the optical fiber holding member;

disposing a fixing substrate between end surfaces of the plurality of glass fibers and the holding substrate of the optical fiber holding member;

adjusting and fixing postures of the plurality of glass fibers around respective central axes, including:

adjusting a posture of a first glass fiber of a plurality of glass fibers around a central axis;

then fixing a vicinity portion of an end surface of the first glass fiber to the fixing substrate to hold the posture of the first glass fiber around the central axis;

then adjusting a posture of a second glass fiber of the plurality of glass fibers adjacent to the first glass fiber around the central axis;

then fixing a vicinity portion of an end surface of the second glass fiber to the fixing substrate to hold the posture of the second glass fiber around the central axis;

then sequentially repeating the adjusting and the fixing for each of the plurality of glass fibers; and then collectively bonding two or more glass fibers among the plurality of glass fibers and the optical fiber holding member with an adhesive; and finally removing the fixing substrate by cleaving the plurality of glass fibers between the fixing substrate and the optical fiber holding member.

10. The method for manufacturing an optical fiber splicing component according to claim 9, wherein the adjusting and fixing the postures includes fixing the plurality of glass fibers to the fixing substrate with the adhesive.

11. The method for manufacturing an optical fiber splicing component according to claim 9, wherein the adjusting and fixing the postures includes fixing the plurality of glass fibers to the fixing substrate by laser welding.

12. The method for manufacturing an optical fiber splicing component according to claim 9, wherein the adjusting and fixing the postures includes fixing the plurality of glass fibers to the fixing substrate by a mechanical fixing unit.

13. A method for manufacturing an optical fiber splicing component, comprising:

preparing a plurality of optical fibers, each optical fiber having a glass fiber that includes a core and a cladding covering the core, a resin coating covering the glass fiber, and an end portion of the glass fiber is exposed from the resin coating;

mounting the plurality of glass fibers on an optical fiber holding member which is a block having a plurality of hole portions extending in a first direction by inserting each of the plurality of glass fibers into the corresponding hole portion so that the plurality of glass fibers exposed from the resin coating are arranged in a second direction perpendicular to the first direction and protrude outward from the optical fiber holding member;

adjusting and fixing postures of the plurality of glass fibers around respective central axes, including:

adjusting a posture of a first glass fiber of a plurality of glass fibers around a central axis;

then fixing a vicinity portion of an end surface of the first glass fiber to the optical fiber holding member to hold the posture of the first glass fiber around the central axis;

then adjusting a posture of a second glass fiber of the plurality of glass fibers adjacent to the first glass fiber around the central axis;

then fixing a vicinity portion of an end surface of the second glass fiber to the optical fiber holding member to hold the posture of the second glass fiber around the central axis;

then sequentially repeating the adjusting and the fixing for each of the plurality of glass fibers; and finally collectively bonding two or more glass fibers among the plurality of glass fibers and the optical fiber holding member with an adhesive.

14. The method for manufacturing an optical fiber splicing component according to claim 13, wherein the fixing of the plurality of glass fibers is conducted by disposing an ultraviolet curable resin in the plurality of hole portions and curing the ultraviolet curable resin by irradiating with ultraviolet rays.

15. The method for manufacturing an optical fiber splicing component according to claim 1, wherein the optical fiber is a multi-core fiber, a polarization maintaining fiber, or a bundle fiber.

* * * * *